United States Patent Office 3,080,920
Patented Mar. 12, 1963

3,080,920
PROCESS FOR FRACTURING FORMATIONS
Clarence R. Fast, Tulsa, Okla., and Robert B. Evans III, Oak Ridge, Tenn., assignors to Pan American Petroleum Corporation, Tulsa, Okla., a corporation of Delaware
No Drawing. Filed June 17, 1959, Ser. No. 820,846
6 Claims. (Cl. 166—42)

This invention relates to fracturing formations penetrated by wells.

In recent years, several aqueous fracturing fluids have been used for fracturing oil producing formations. Ordinary water has been used in some cases. Aqueous fracturing liquids usually have two objectionable features. First, if the formation is oil-wet or in a mixed oil and water-wet condition, the aqueous fracturing liquid can become a discontinuous phase in the pores of the formation when the well is returned to production. This means the water may exist as individual, separate droplets. Such droplets can at least partially block flow of oil to the well penetrating the oil producing formation. This is ordinarily called a water block. Second, some of the aqueous fracturing fluids, particularly water free from additives, flows so readily through the pores of the formation that a fracture of the desired extent sometimes cannot be formed.

An object of this invention is to provide a fracturing process in which there is a decreased tendency for aqueous fracturing fluids to form water blocks. Another object of the invention is to provide a fracturing process in which aqueous fracturing fluids flow less easily into the pores of the formation thus permitting the creation of more extensive fractures. Still other objects will be apparent to those skilled in the art from the following description and claims.

In general, we acomplish the objects of our invention by making the formation water-wet before or during the fracturing operation. One result is that the oil tends to become separated into droplets to establish an oil block during the fracturing operation. This oil block resists flow of the aqueous fracturing liquid into the pores of the formation. Thus, a high pressure can be maintained to extend the fracture to a greater distance from the well. Another result of making the formation water-wet is that upon completion of the fracturing operation, oil flows more easily to the well. The reason is that the water has a continuous bow path along the walls of the pores and capillaries in the formation. It does not, therefore, tend to become separated into droplets. Instead, the water flows easily out of the formation leaving a large amount of the centers of the pore spaces free for flow of oil to the well.

Several agents and methods can be used for making the formation water-wet. Preferably, aqueous solutions of detergents are used. For example, the reaction product of 1 mole of nonyl phenol and about 9 or 10 moles of ethylene oxide can be used in a concentration of about 1 percent by weight in an aqueous solution to remove oil from oil-wet surfaces. A preferred detergent is the condensation product of 2 moles of ethanolamine with 1 mole of coconut oil fatty acids, with the excess amine neutralized with dodecyl benzene sulfonic acid. Inorganic agents, such as trisodium phosphate, sodium hexametaphosphate or the like, can also be used. Still others will be apparent to those skilled in the art.

The detergent materials can be incorporated into the aqueous fracturing liquids if desired. At least about 0.1 percent, and preferably about 0.5 to about 1 percent by weight, of the agents should be used to provide a rapid action. The organic detergents normally should not be used in concentrations much above about 5 percent since most of them are also emulsifying agents in higher concentrations, and emulsions are sometimes difficult to remove from the formation. The inorganic agents, however, can be used in higher concentrations up to 10 or 15 percent by weight if desired. In order to avoid emulsion difficulties, the fracturing liquids should be substantially free from oil. That is, they should contain not more than about 1 percent of oil by volume. The absence of oil also tends to insure good contact of the aqueous phase with the formation surfaces to establish the desired continuous flow paths through which the aqueous fracturing liquid can flow back out of the formation.

If desired, an aqueous treated solution of the water-wetting agent can be injected into the formation ahead of the aqueous fracturing fluid. In such cases, the volume of the treating solution should be at least about 10 percent of the volume of the fracturing liquid. This is to insure that some of the treating solution will advance in the fracture, as it forms, to a considerable distance from the well before the solution is lost to the formation on both sides of the fracture. Thus, the formation is made water-wet on both sides of the fracture to a considerable distance from the well. Preferably, the treating solution of the water-wetting agent should amount to about 20 or 30 percent of the fracturing fluid volume. Smaller volumes can be used if desired to treat only the zone near the well where higher pressures and flow rates are involved. Larger volumes can also be used if desired, the principal question being whether they are justified from an economic standpoint. The volumes of fracturing liquids should be approximately the same as those now used. Due to the tendency for oil blocks to form in our process, however, a smaller volume of fracturing liquid will ordinarily be required to produce a fracture extending to a given distance from a well.

It is also sometimes advisable to inject intermittent slugs or batches of treating solutions to make the formation water-wet, and aqueous fracturing liquids free from wetting agents. Thus, there is always a batch of treating solution preceding each batch of fracturing fluid so the formation is contacted by the treating solution to the full extent of the fracture.

When separate treating solutions and fracturing fluids are used, that is, when the detergent or other wetting agent is not included in the fracturing fluid, it is sometimes advisable to allow a soaking period after at least part of the treating solution has been injected. This permits the treating solution to act more effectively to remove oil from the surfaces so that these surfaces will be more effectively water-wet. The soaking time or times may vary from a few minutes, such as five minutes, to several hours, such as 24 hours if desired.

After a treating solution has been used to make a formation water-wet, a small batch of oil may be injected to form a discontinuous phase of oil droplets in the pores of the formation and establish a more effective oil block. This aids in resisting penetration of the aqueous fracturing liquid into the formation. Preferably, a refined oil, such as diesel oil, kerosene, or the like, should be used since some crude oils contain naturally occurring agents which promote wetting of the formation by the oil. This is particularly true where the formation in contact with the oil is known to be naturally oil-wet either in part or wholly. If no ready source of cheap refined oil is available, however, some benefits can usually be derived by use of crude oil.

Agents other than detergents can also be used in our process to cause the formation to become water-wet. For example, strong oxidizing agents, such as hydrogen peroxide, can be used. These are particularly useful if the oil in the formation is of an asphaltic nature and has deposited a coating of asphalt on the pore and capillary surfaces. The strong oxidizing agents are effective for removing such materials so water can wet the underlying rock surfaces.

While the strong oxidizing agents are particularly applicable to removing asphalt from formations covered with this material, they can, of course, be used to make other formations water-wet. If asphalt must be removed, high concentrations of the strongest oxidizing agents should be used. A soaking period should also be provided in such cases. If little or no asphalt must be removed from the formation surfaces, lower concentrations of agents of less oxidizing power can generally be used. In such cases, a soaking period can sometimes be omitted as when the fracturing liquid itself contains the oxidizing agent.

Nitric acid and chromic acid solutions have been used to convert samples of the Tensleep formation from Wyoming and the Bradford formation from Pennsylvania to a water-wet condition. The Tensleep samples were shown to be oil-wet when broken into small pieces and added to water or oil. The small particles fell through the water as aggregated clumps. In the oil, the particles dispersed individually into the oil. In the case of the Bradford sand, the surfaces of the pores and capillaries were coated with a visible covering of asphalt. The nitric acid and chromic acid were capable of converting the Tensleep samples to a water-wet condition. If allowed sufficient time, they also removed most of the asphalt from the Bradford samples permitting them to become at least partly water-wet.

By far, the most effective oxidizing agent was a 35 percent by weight aqueous solution of hydrogen peroxide. When cores about ¾-inch in diameter and a little over an inch long of both the Tensleep and Bradford formation were soaked in the hydrogen peroxide solution for about 8 hours, the cores were completely white and were also completely wet with water.

Still another method of making formations water-wet is by adjusting the pH and salinity of the fracturing fluid or of a treating solution which precedes the fracturing fluid. The proper pH and salinity to cause the formation to become water-wet are preferably determined by measuring the contact angle of an oil-water interface against a surface similar to that present in the formation to be fractured. The oil in this measurement should be the oil in the formation and the water should be the aqueous solution to be used in making the formation water-wet. The methods and apparatus for determining the proper pH and salinity are more completely described in an article entitled, "Improving Oil Displacement Efficiency by Wettability Adjustment" by O. R. Wagner and R. O. Leach in the Journal of Petroleum Technology, volume 216, page 65.

If this method is used, it will ordinarily be preferred to injecting the treating solution and allow it to remain in contact with the formation for several hours before injecting the aqueous fracturing liquid. This is because the adjustment of pH and salinity does not ordinarily make the formation water-wet as rapidly as some of the strong detergents, oxidizing agents or the like. Some advantages are usually obtained, however, in the absence of a soaking period. As noted above, the pH and salinity of the fracturing liquid itself may be adjusted to cause this fluid to make the formation water-wet and thus provide a continuous path through which the water can flow back io the well with a minimum tendency to block the flow of oil.

Still other methods will be apparent to those skilled in the art for making formations water-wet. For example, solvents such as carbon tetrachloride, carbon disulfide, benzene, acetone, isopropanol or the like may be used to remove oil, asphalt, paraffin and the like from the surfaces of capillaries in the formation. Some of these solvents, such as the low molecular weight ketones and alcohols, can be displaced directly with water to leave a water-wet surface. Others, such as carbon tetrachloride, should be removed with an aqueous solution of a detergent or the like to insure that the formation is in a water-wet condition.

Our invention will be better understood from the following example. A test was made to determine the effects of changing the oil-wet capillary surfaces of a formation to a water-wet condition. For this test, cores were obtained from the Cardium sand of the Pembina Field in Canada. Large cores of this naturally oil-wet formation had been obtained during drilling of a well with an oil-base drilling fluid. The large cores were shipped and stored in oil and small cores, ¾-inch in diameter and about 1½ inches long, were obtained from the large cores using kerosene as a drilling fluid. Each small core was mounted in a rubber sleeve around which pressure was applied to seal the sleeve to the core, leaving the ends of the core exposed for introduction and withdrawal of liquids.

One of the small cores was treated as follows. First, a petroleum fraction was forced through the core under a pressure of about 100 pounds per square inch on the inlet side and about 50 pounds per square inch on the outlet. The petroleum fraction contained hydrocarbons having predominantly from about 10 to about 12 carbon atoms per molecule. The rate of flow of the petroleum fraction through the core was measured. Distilled water was then forced through the core in the same direction and under the same pressure, the rate of flow being measured. The petroleum fraction was then forced back through the core in the opposite direction to simulate putting a well on production after treatment. The pressure across the core was the same as before. The rate of flow was measured. The permeabilities to flow of the liquids were then calculated to take into account the dimensions of the core, pressure differentials, flow rates and viscosities of the liquids.

The test procedure outlined above was repeated with another small core except that instead of using distilled water an aqueous solution containing 1 percent by weight of a detergent was used. In still another core, a different detergent was used. The results of the three tests are reported in Table A.

*Table A*

| Initial Permeability to Oil, Md. | Aqueous Liquid | Permeability to Aqueous Liquid | | Back flow Oil Permeability | |
|---|---|---|---|---|---|
| | | Md. | Percent Initial | Md. | Percent Initial |
| 51.6 | Distilled Water | 41.9 | 81.2 | 21.3 | 41.3 |
| 52.4 | 1 Percent Detergent A | 34.1 | 65.1 | 35.4 | 67.6 |
| 62.7 | 1 Percent Detergent B | 56.0 | 89.3 | 43.5 | 69.4 |

Detergent A is the condensation product of 2 moles of ethanolamine with 1 mole of coconut oil fatty acids with the excess amine neutralized with dodecyl benzene sulfonic acid. Detergent B is nonyl phenol reacted with about 9 or 10 moles of ethylene oxide per mole of nonyl phenol. All permeabilities were measured after stabilized conditions of flow had been established by flowing several pore volumes of liquids through the core.

It will be apparent that the solution of Detergent A entered and flowed through the core much less readily than distilled water. The permeability to distilled water was 81.2 percent of the original permeability to oil while the permeability to the detergent solution was only 65.1 percent of the original permeability to oil. The result is a decreased loss of fracturing fluid to the formation and a fracture extending to a greater distance from the well. More important, the solution of Detergent A was removed from the core much more effectively than distilled water upon backflow of oil. The permeability to backflow of oil was 50 percent higher in the case of the Detergent A solution. In a well this means an ability to produce oil at a higher rate.

In the case of Detergent B, the solution of this agent entered the core more easily than distilled water; but again, the solution was removed much more effectively from the formation upon backflow of oil. The permeability to oil was more than 50 percent greater than after treatment with distilled water.

Our invention is principally applicable to formations which are preferentially oil wettable. It should be pointed out, however, that preferential oil wettability or water wettability is a matter of degree. In terms of oil-water interface contact angle with formation surfaces, if the contact angle is 90°, the formation is not preferentially wet by either liquid. If the angle is 80°, the formation is slightly preferentially water-wet, but if a limited amount of water is present, as in many oil-bearing formations, much of the surface will usually still be oil-wet. It is quite possible that such a formation, which is actually preferentially water wettable, may contain such a small amount of water that the water is discontinuous. It will be apparent that our process is of value in such formations to make the surfaces actually water-wet so that the oil phase can become discontinuous and form an oil block, and the water phase will become continuous on the solid surfaces to provide adequate flow paths for escape of the water from the formation when the well is produced. Thus, the process should not be construed as limited to formations which are preferentially oil wettable. The method also has value in the fracturing of preferentially water wettable, oil-producing formations.

We claim:

1. A method for fracturing a preferentially oil-wettable oil-producing formation penetrated by a well comprising injecting into said formation an aqueous solution of an agent capable of making said formation water-wet, next injecting into said formation a batch of mineral oil, and finally injecting into said formation an aqueous fracturing liquid under a pressure sufficient to fracture said formation.

2. The method of claim 1 in which said agent is a strong oxidizing agent capable of making said formation water-wet.

3. The method of claim 1 in which said formation is free from asphalt coating and in which said agent is the condensation product of 2 moles of ethanolamine with about 1 mole of coconut oil fatty acids, with the excess amine substantially neutralized with dodecyl benzene sulfonate.

4. A method of fracturing a preferentially oil-wettable oil-producing formation penetrated by a well comprising injecting into said formation an aqueous fracturing liquid and the condensation product of 2 moles of ethanolamine with about 1 mole of coconut oil fatty acids, with the excess amine substantially neutralized with dodecyl benzene sulfonic acid, the amount of the condensation product being sufficient to make said formation water-wet said aqueous fracturing liquid being injected under a pressure sufficient to fracture said formation.

5. A method of fracturing a preferentially oil-wettable oil-producing formation penetrated by a well comprising injecting into said formation an aqueous fracturing liquid containing the condensation product of 2 moles of ethanolamine with about 1 mole of coconut oil fatty acids, with the excess amine substantially neutralized with dodecyl benzene sulfonic acid, the amount of said condensation product being sufficient to make said formation water-wet said aqueous fracturing liquid being injected under a pressure sufficient to fracture said formation.

6. A method of fracturing a preferentially oil-wettable oil-producing formation penetrated by a well comprising injecting into said formation an aqueous solution of the condensation product of 2 moles of ethanolamine with about 1 mole of coconut oil fatty acids, with the excess amine substantially neutralized with dodecyl benzene sulfonic acid, the amount of said condensation product being sufficient to make said formation water-wet, and then injecting an aqueous fracturing liquid under a pressure sufficient to fracture said formation.

References Cited in the file of this patent

UNITED STATES PATENTS

| | | |
|---|---|---|
| 2,221,353 | Limerick | Nov. 12, 1940 |
| 2,233,381 | De Groote et al. | Feb. 25, 1941 |
| 2,356,205 | Blair | Aug. 22, 1944 |
| 2,716,454 | Abendroth | Aug. 30, 1955 |
| 2,759,975 | Chiddix | Aug. 21, 1956 |
| 2,796,131 | Hinchcliffe et al. | June 18, 1957 |
| 2,800,962 | Garst | July 30, 1957 |
| 2,812,817 | Sayre | Nov. 12, 1957 |
| 2,838,116 | Clark | June 11, 1958 |
| 2,838,117 | Clark | June 11, 1958 |
| 2,946,747 | Kirkpatrick | July 26, 1960 |